(12) United States Patent
Acevedo Velez et al.

(10) Patent No.: US 10,752,793 B2
(45) Date of Patent: Aug. 25, 2020

(54) COMPOSITIONS, AQUEOUS COATING COMPOSITIONS, AND METHODS FOR IMPROVING THE FREEZE/THAW STABILITY OF AQUEOUS COATING COMPOSITIONS

(71) Applicant: Dow Global Technologies LLC, Midland, MI (US)

(72) Inventors: Claribel Acevedo Velez, Houston, TX (US); Sudhakar Balijepalli, Midland, MI (US); Rebecca J. Wachowicz, Bay City, MI (US)

(73) Assignee: Dow Global Technologies LLC, Midland, MI (US)

( * ) Notice: Subject to any disclaimer, the term of this patent is extended or adjusted under 35 U.S.C. 154(b) by 6 days.

(21) Appl. No.: 16/081,643

(22) PCT Filed: Mar. 21, 2017

(86) PCT No.: PCT/US2017/023376
§ 371 (c)(1),
(2) Date: Aug. 31, 2018

(87) PCT Pub. No.: WO2017/172410
PCT Pub. Date: Oct. 5, 2017

(65) Prior Publication Data
US 2019/0062576 A1 Feb. 28, 2019

Related U.S. Application Data

(60) Provisional application No. 62/313,971, filed on Mar. 28, 2016.

(51) Int. Cl.
| | | |
|---|---|---|
| *C09D 7/63* | (2018.01) | |
| *C09D 133/08* | (2006.01) | |
| *C09D 171/02* | (2006.01) | |
| *C08K 5/05* | (2006.01) | |
| *C08K 5/06* | (2006.01) | |
| *C08K 5/10* | (2006.01) | |
| *C09D 7/65* | (2018.01) | |
| *C08L 71/02* | (2006.01) | |
| *C08G 65/26* | (2006.01) | |
| *C09D 5/02* | (2006.01) | |

(52) U.S. Cl.
CPC ............ *C09D 7/65* (2018.01); *C08G 65/2612* (2013.01); *C08K 5/10* (2013.01); *C08L 71/02* (2013.01); *C09D 5/024* (2013.01); *C09D 5/027* (2013.01); *C09D 7/63* (2018.01); *C09D 133/08* (2013.01); *C09D 171/02* (2013.01)

(58) Field of Classification Search
CPC ..... C09D 7/63; C09D 7/65; C08K 5/05; C08K 5/06
See application file for complete search history.

(56) References Cited

U.S. PATENT DOCUMENTS

| | | |
|---|---|---|
| 3,538,033 A | 11/1970 | Kao Corp |
| 6,933,415 B2 | 8/2005 | Zhao et al. |
| 7,705,081 B2 | 4/2010 | Porzio et al. |
| 7,906,577 B2 | 3/2011 | Zong et al. |
| 8,901,213 B2 | 12/2014 | Graf et al. |
| 8,993,658 B2 | 3/2015 | Graf et al. |
| 2008/0119600 A1* | 5/2008 | Anchor ............... C09D 5/024 524/394 |
| 2008/0188603 A1 | 8/2008 | Porzio et al. |
| 2012/0258249 A1 | 10/2012 | Adamson et al. |
| 2015/0073080 A1 | 3/2015 | Wu |

FOREIGN PATENT DOCUMENTS

| | | |
|---|---|---|
| EP | 2508577 A2 | 10/2012 |
| EP | 2653512 A2 | 10/2013 |
| EP | 2657271 B1 | 5/2015 |
| JP | H11-189996 A | 7/1999 |
| JP | 2011-201996 A | 10/2011 |
| WO | 2013/138209 A1 | 9/2013 |

OTHER PUBLICATIONS

Dow's Technical Data Sheet for Dowanol EPh6 (Year: 2011).*
Machine-generated English-language translation of JP H11-189996A.*
Zong, Progress in Organic Coatings, 2015, vol. 72, p. 115-119.
Khan, Paints and Coatings Industry Magazine, Mar. 3, 2014.
PCT/US2017/023376, International Search Report and Written Opinion dated Jun. 13, 2017.
PCT/US2017/023376, International Preliminary Report on Patentability dated Oct. 11, 2018.

* cited by examiner

*Primary Examiner* — Vu A Nguyen

(57) ABSTRACT

Embodiments of the present invention relate to compositions, aqueous coating compositions, and methods for improving the freeze/thaw stability of aqueous coating compositions. In one aspect, a method for improving the freeze/thaw stability of an aqueous coating composition comprising an aqueous polymeric dispersion, the method comprising adding the following compound to the aqueous coating composition: (Formula (I)) wherein n=4 to 8.

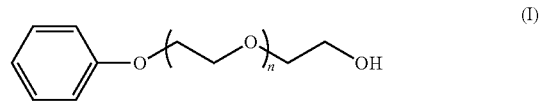

(I)

18 Claims, No Drawings

COMPOSITIONS, AQUEOUS COATING COMPOSITIONS, AND METHODS FOR IMPROVING THE FREEZE/THAW STABILITY OF AQUEOUS COATING COMPOSITIONS

FIELD

The present invention relates to compositions and aqueous coating compositions, and to methods for improving the freeze/thaw stability of aqueous coating compositions.

INTRODUCTION

Manufacturers of paints and coatings are developing new latex binders that do not require the use of volatile solvents and coalescing agents in response to environmental regulations that limit the use of volatile organic compounds (VOC). One of the primary challenges in eliminating solvents from a paint or coating formulation is associated with freeze-thaw stability of the formulation.

Paints and coatings are often subjected to freezing and thawing cycles during storage and shipping due to a lack of temperature control. Under such conditions, the colloidal stability of latex resin particles is compromised, and can result in changes in the consistency of the paint or coating due to drastic changes in formulation viscosity. This can cause the paint or coating to be unusable in many instances.

Solvents such as glycols have been historically used to protect paints and coatings from freeze-thaw stability problems. However, glycol solvents typically have high levels of VOCs.

It would be desirable to have new additives for improving the freeze-thaw stability of paints and other coatings but with reduced levels of VOCs.

SUMMARY

The present invention provides additives for paints and other coatings that can improve the freeze-thaw stability of the paints/coatings. In some embodiments, such additives can provide good coalescence and freeze-thaw protection to the paints/coatings. In some embodiments, such additives have low to near zero-VOC content.

In one aspect, the present invention provides a method for improving the freeze/thaw stability of an aqueous coating composition comprising an aqueous polymeric dispersion, the method comprising adding the compound of Formula 1 to the aqueous coating composition:

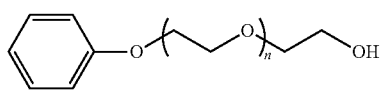

(Formula 1)

wherein n=4 to 8. The aqueous coating composition can be a paint or coating, in some embodiments.

In another aspect, the present invention provides an aqueous coating composition, such as a paint, that comprises an aqueous polymeric dispersion and the compound of Formula 1:

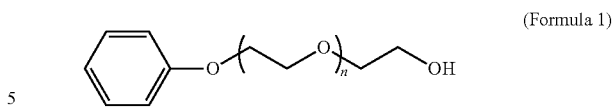

(Formula 1)

wherein n=4 to 8 and wherein the coating composition comprises 5 to 10 percent by weight of Formula 1 based on the weight of the polymeric dispersion solids.

In another aspect, the present invention provides a composition that comprises the compound of Formula 1:

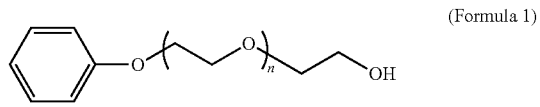

(Formula 1)

wherein n=4 to 8; and
the compound of Formula 2:

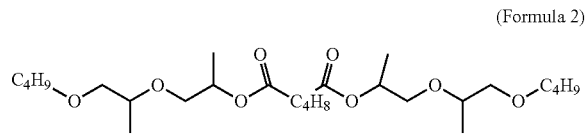

(Formula 2)

wherein the composition comprises 30 to 70 percent by weight of Formula 1 and 30 to 70 percent by weight of Formula 2

These and other embodiments are described in more detail in the Detailed Description.

DETAILED DESCRIPTION

As used herein, "a," "an," "the," "at least one," and "one or more" are used interchangeably. The terms "comprises," "includes," and variations thereof do not have a limiting meaning where these terms appear in the description and claims. Thus, for example, an aqueous composition that includes particles of "a" hydrophobic polymer can be interpreted to mean that the composition includes particles of "one or more" hydrophobic polymers.

Also herein, the recitations of numerical ranges by endpoints include all numbers subsumed in that range (e.g., 1 to 5 includes 1, 1.5, 2, 2.75, 3, 3.80, 4, 5, etc.). For the purposes of the invention, it is to be understood, consistent with what one of ordinary skill in the art would understand, that a numerical range is intended to include and support all possible subranges that are included in that range. For example, the range from 1 to 100 is intended to convey from 1.01 to 100, from 1 to 99.99, from 1.01 to 99.99, from 40 to 60, from 1 to 55, etc. Also herein, the recitations of numerical ranges and/or numerical values, including such recitations in the claims, can be read to include the term "about." In such instances the term "about" refers to numerical ranges and/or numerical values that are substantially the same as those recited herein.

Some embodiments of the present invention relate to methods for improving the freeze/thaw stability of an aqueous coating composition comprising an aqueous polymeric dispersion, such as paint or a coating. In some embodiments, the method comprises adding the compound of Formula 1 to the aqueous coating composition:

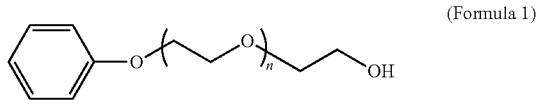

(Formula 1)

wherein n=4 to 8. In some embodiments, n=5 to 7, while n=5 to 6 in other embodiments.

In some embodiments, 5 to 10 percent by weight of Formula 1 is added to the aqueous coating composition, based on the weight of the polymeric dispersion solids. 5 to 8 percent by weight of Formula 1 is added to the aqueous coating composition, based on the weight of the polymeric dispersion solids, in some embodiments.

In some embodiments, methods of the present invention further comprise adding at least one coalescent to the aqueous coating composition. Such a coalescent, in some embodiments, comprises the compound of Formula 2:

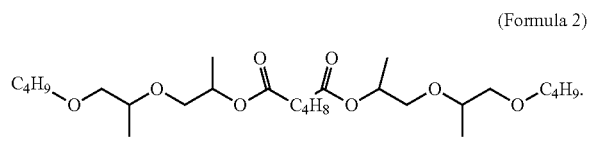

(Formula 2)

In some embodiments, 2 to 12 percent by weight of Formula 2 is added to the aqueous coating composition, based on the weight of the polymeric dispersion solids. The coalescent, in some embodiments, comprises at least one of propylene glycol phenyl ether, ethylene glycol phenyl ether, dipropylene glycol n-butyl ether, ethylene glycol n-butyl ether benzoate, tripropylene glycol n-butyl ether, 2,2,4-trimethyl-1,3-pentanediol monoisobutyrate, and triethylene glycol bis-2-ethylhexanoate.

The aqueous polymeric dispersion comprises an acrylic polymer in some embodiments.

In some embodiments, methods of the present invention further comprise adding one or more polyalkoxylates to the aqueous coating composition.

Some embodiments of the present invention relate to aqueous coating compositions, such as paints or other coatings. Aqueous coating compositions, in some embodiments, comprise an aqueous polymeric dispersion and the compound of Formula 1:

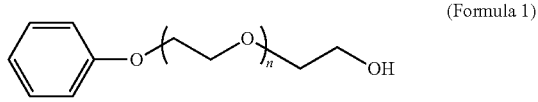

(Formula 1)

wherein n=4 to 8 and wherein the coating composition comprises 5 to 10 percent by weight of Formula 1 based on the weight of the polymeric dispersion solids. In some embodiments, n=5 to 7, while n=5 to 6 in other embodiments. 5 to 8 percent by weight of Formula 1 is added to the aqueous coating composition, based on the weight of the polymeric dispersion solids, in some embodiments. The aqueous polymeric dispersion comprises an acrylic polymer in some embodiments.

In some embodiments, aqueous coating compositions of the present invention further comprise at least one coalescent. Such a coalescent, in some embodiments, comprises the compound of Formula 2:

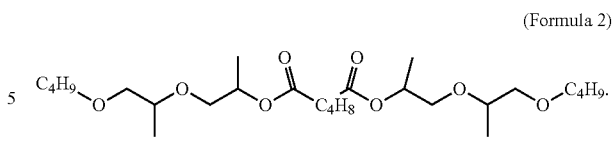

(Formula 2)

In some embodiments, aqueous coating compositions of the present invention comprise 2 to 12 percent by weight of Formula 2, based on the weight of the polymeric dispersion solids. The coalescent, in some embodiments, comprises at least one of propylene glycol phenyl ether, ethylene glycol phenyl ether, dipropylene glycol n-butyl ether, ethylene glycol n-butyl ether benzoate, tripropylene glycol n-butyl ether, 2,2,4-trimethyl-1,3-pentanediol monoisobutyrate, and triethylene glycol bis-2-ethylhexanoate.

In some embodiments, aqueous coating compositions of the present invention further comprise one or more polyalkoxylates.

Some embodiments of the present invention relate to compositions that comprise the compound of Formula 1:

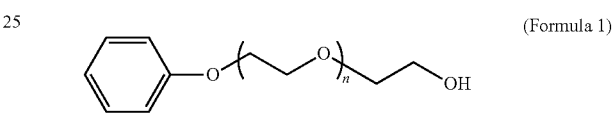

(Formula 1)

wherein n=4 to 8; and
the compound of Formula 2:

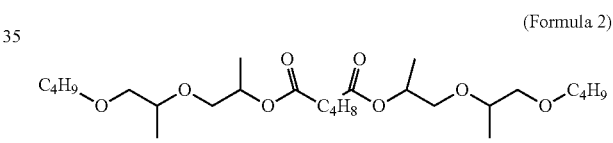

(Formula 2)

wherein the composition comprises 30 to 70 percent by weight of Formula 1 and 30 to 70 percent by weight of Formula 2. In some embodiments, n=5 to 7, while n=5 to 6 in other embodiments. Such compositions can be provided as additives to aqueous coating compositions, such as paints or other coatings, in some embodiments.

Compounds of Formula 1 to be used in various embodiments of the present invention can be obtained by reacting alcohols with ethylene oxide. Preferred glycol ethers, such as polyethylene glycol monophenyl ether, are prepared by reacting phenol with ethylene oxide in the presence of a catalyst (e.g., sodium hydroxide, potassium hydroxide, or others) using techniques known to skill in the art. Any of several synthetic methods known to those skilled in the art can be used to prepare the aforementioned polyethylene glycol monophenyl ethers. As the synthesis results in a distribution of polyethylene glycol monophenyl ether homologues, the relative amounts of phenol and ethylene oxide can be selected to obtain the desired distribution of homologues. For example, the ratio of ethylene oxide to phenol can be selected to provide a distribution of Formula 1 compounds wherein n is predominantly between 4 and 8 and/or wherein the average n value is between 5 and 6. Polyethylene glycol monophenyl ethers obtained by any of the aforementioned methods can be purified according to methods known to those skilled in the art, such as by low pressure stripping.

The reaction can be carried out in a batch or continuous manner. As noted above, an alkaline catalyst, such as sodium hydroxide or potassium hydroxide, can be used to enhance the reaction. It is possible to remove the catalyst from the reaction mixture so that the reaction mixture is substantially free of catalyst, and in one embodiment of the invention, the catalyst is removed from the reaction mixture. In some embodiments, the catalyst is neutralized in the reaction mixture by adding an acid such as phosphoric acid. Advantageously, the residence time in the distillation process is minimized in order to avoid product degradation.

One example of a polyethylene glycol monophenyl ether of Formula 1 that can be used in some embodiments is DOWANOL™ EPh6, which is commercially available from The Dow Chemical Company. DOWANOL™ EPh6 comprises a blend of polyethylene glycol monophenyl ethers of Formula 1 having an average of n=5-6.

In one aspect, compounds of Formula 1 can be added to an aqueous coating composition to improve the freeze/thaw stability of the aqueous coating composition according to methods of the present invention. Paint is one example of such an aqueous coating composition.

In one aspect of the present invention, there is provided an aqueous coating composition comprising an aqueous polymeric dispersion and from 5 to 10% by weight, based on the weight of polymeric dispersion solids, of the compound of Formula 1 described herein. In some embodiments, the aqueous coating composition comprises from 5 to 8% by weight, based on the weight of polymeric dispersion solids, of the compound of Formula 1 described herein.

The aqueous coating composition can further comprise one or more coalescents in some embodiments. By "coalescent" is meant an ingredient that facilitates the film formation of an aqueous polymeric dispersion, particularly an aqueous coating composition that includes a dispersion of polymer in an aqueous medium such as, for example, a polymer prepared by emulsion polymerization techniques. An indication of facilitation of film formation is that the minimum film forming temperature ("MFFT") of the composition including the aqueous polymeric dispersion is measurably lowered by the addition of the coalescent. In other words, MFFT values are indicative of how efficient a coalescent is for a given aqueous polymeric dispersion; it is desirable to achieve the lowest possible MFFT with the smallest amount of coalescent. MFFTs of the aqueous coating compositions herein are measured using ASTM D 2354 and a 5 mil MFFT bar as described in Example 1.

In some embodiments, an aqueous coating composition of the present invention comprises from 2 to 12% by weight, based on the weight of aqueous polymeric dispersion solids, of a coalescent. In some embodiments, an aqueous coating composition of the present invention comprises 6 to 8% by weight, based on the weight of aqueous polymeric dispersion solids, of a coalescent.

A coalescent, in some embodiments, comprises the compound of Formula 2:

(Formula 2)

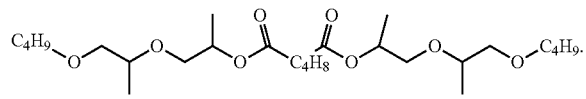

Compounds such as Formula 2 can be prepared as disclosed in U.S. Patent Publication No. 2012/0258249, which is hereby incorporated by reference. Other glycol ether ester-compounds disclosed in U.S. Patent Publication No. 2012/0258249 can also be used as a coalescent in to some embodiments.

The coalescent, in some embodiments, comprises at least one of propylene glycol phenyl ether, ethylene glycol phenyl ether, dipropylene glycol n-butyl ether, ethylene glycol n-butyl ether benzoate, tripropylene glycol n-butyl ether, 2,2,4-trimethyl-1,3-pentanediol monoisobutyrate, triethylene glycol bis-2-ethylhexanoate, tributyl citrate, and/or the compound of Formula 2. Such coalescents are commercially available from The Dow Chemical Company (e.g., UCAR™ Filmer IBT), Eastman Chemical Company (e.g., Eastman Optifilm Enhancer 400), and others.

In some embodiments, aqueous coating compositions of the present invention further comprise one or more polyalkoxylates. In an aqueous coating composition of the present invention, such polyalkoxylates can allow the coating composition to stay wetter longer (i.e., extend the drying time). The one or more polyalkoxylates can be represented by the formula I-[AO$_n$H]$_f$ wherein I is an organic active hydrogen containing compound, AO is an alkylene oxide that comprises ethylene oxide (EO) or EO combined with propylene oxide (PO) and/or butylene oxide (BO) in a random order or in an oligomer having blocks, preferably, at least one block of EO, n is the total number of AO groups and f is the total number of active hydrogen groups in I, which ranges from 2 to 15 or, preferably, from 3 to 10, or, more preferably, from 3 to 8.

Suitable active hydrogen compounds I for making the polyalkoxylates of the present invention may be chosen from diols, such as glycols, phenols having 2 hydroxyl groups, such as cresols; and difunctional aminoalcohols like diethanol amine; polyols having 3 or more hydroxyl groups, such as glycerol, pentaerythritol, sugar alcohol like sorbitol, xylitol or mannitol; diamines, such as ethylenediamine; triamines, such as diethylenetriamine; polyamines, such as polylysine or polyethylene imines; phenolic resins having from 2 to 15 or, preferably, from 2 to 8 or, preferably, 3 or more, hydroxyl groups, such as hydroxyl functional phenol formaldehyde resins; epoxy adducts of glycidyl ether with polyols; epoxy adducts of glycidyl ethers with diamines or polyamines, such as disecondary diamines Preferably, the active hydrogen compounds are polyols having 3 or more hydroxyl groups, difunctional aminoalcohols, diamines, triamines, polyamines and phenolic resins having 3 to 8 hydroxyl groups.

The ethylene oxide (EO) content of the one or more polyalkoxylates may be anywhere from 20 to 70 wt. %, or, preferably, from 20 to 50 wt. %, based on the total weight of solids in the polyalkoxylate. The EO content should be sufficiently large to make the polyalkoxylate water dispersible, and yet low enough that the polyalkoxylates are little enough to be compatible with binder.

The number average molecular weight or Mn of the one or more polyalkoxylates may range from 800 to 10,000 or, preferably, 5,000 or less. Too high an Mn may result in gelling and/or flocculation or an aqueous composition containing the polyalkoxylate. Preferably, the Mn of the one or more polyalkoxylates ranges 800 to 5000.

Examples of polyalkoxylates may include, for example, diethoxylated propylene glycol, triethoxylated glycerine, pentaethoxylated triethylene pentamine, ethoxylated alkyl phenol formaldehyde resins, $C_1$ to $C_{18}$ alk(en)ylamine (poly) alkoxylates, such as ethoxylated cocamine or tallow amine, $C_1$ to $C_{18}$ alk(en)yl diamine (poly)alkoxylates, such as ethoxylated tallow aminopropylamine, a $C_1$ to $C_{18}$ alk(en)

ylamine (poly)alkoxylates, such as NINOL™ 40-CO Cocamide DEA (Stepan Company, Northfield, Ill.), ethoxylated cocamines available as Ethomeen™ C/12 or Ethomeen™ C/15 available from Akzo Nobel Chemicals Inc., Arnhem, Netherlands, and castor oil ethoxylates or propoxylates.

The one or more polyalkoxylates can be made in a conventional fashion by reacting the active hydrogen compound with ethylene oxide or a combination of ethylene oxide as well as propylene oxide and/or butylene oxide.

The reaction of the active hydrogen compound with ethylene oxide to make the one or more polyalkoxylates can be carried out in a pressure reactor or autoclave at from 50 to 200° C., or, preferably, from 90 to 150° C. at a pressure of from 100 to 2000 kPa. A basic catalyst may be used, such as sodium methanolate, an alkal metal hydroxide like NaOH or KOH.

As described below, the compound of Formula 1 and one or more coalescents can be provided as part of an aqueous coating composition. However, in some embodiments, a composition comprising the compound of Formula 1, wherein n=4 to 8 (or 5 to 7 or 5 to 6), and one or more coalescents can be prepared as a composition, and such compositions can be provided to third parties. Such third parties might be, for example, manufacturers of aqueous coating compositions that can incorporate the composition comprising the Formula 1 compound and the coalescent(s) into their coating compositions. Thus, some embodiments of the present invention relate to compositions comprising the compound of Formula 1, wherein n=4 to 8 (or 5 to 7 or 5 to 6), and the compound of Formula 2, wherein the composition comprises 30 to 70 percent by weight of Formula 1 and 30 to 70 percent by weight of Formula 2.

With regard to aqueous polymeric dispersions that can be included in aqueous coating compositions of the present invention, the aqueous polymeric dispersion may be a dispersion comprising a polymer, oligomer, prepolymer, or a combination thereof in an aqueous medium. In some embodiments, the aqueous polymeric dispersion forms a film upon evaporation of water and is not reactive. By "aqueous medium" is meant herein a medium including at least 50%, by weight based on the weight of the medium, water. The polymer, oligomer, prepolymer, or combination in the aqueous polymeric dispersion is often referred to as a binder. The choice of binder is not particularly critical, and the binder can be selected from all type of binders known in the art including, for example, styrene-acrylic, all acrylic, vinyl acrylic, and vinyl acetate polymeric binders, and hybrids of these and other chemistries. In one embodiment of the invention, the binder is a binder that is suitable for use for interior wall paint.

The average particle diameter of the polymer particles in the dispersion is not particularly critical, and advantageously is from 40 nm to 1000 nm, preferably from 40 nm to 300 nm. Particle diameters herein are those measured by dynamic light scattering on a Brookhaven BI-90 Plus particle size analyzer.

In some embodiments, the invention includes an aqueous coating composition comprising: (a) a polymeric binder; (b) optionally, a pigment; (c) water; (d) the compound of Formula 1 as described hereinabove; and (e) at least one coalescent as described hereinabove. The coating composition can be employed in uses such as, for example, wall paints, floor coatings, ceiling paints, and window frame coatings.

The aqueous coating composition of the invention can be prepared by techniques which are well known in the coatings art. First, pigment(s), if any, are well dispersed in an aqueous medium under high shear, such as is afforded by a COWLES™ mixer, or predispersed colorant(s), or mixtures thereof are used. Then the aqueous polymeric dispersion is added under low shear stirring along with the compound of Formula 1 as described hereinabove, at least one coalescent, and other coatings adjuvants as desired. The aqueous coating composition may include, in addition to the aqueous polymeric dispersion and optional pigment(s), conventional coatings adjuvants such as, for example, extenders, emulsifiers, plasticizers, curing agents, buffers, neutralizers, rheology modifiers, humectants, biocides, antifoaming agents, UV absorbers, fluorescent brighteners, light and/or heat stabilizers, biocides, chelating agents, dispersants, colorants, waxes, and water-repellants.

The pigment can be selected from the wide range of materials known to those skilled in the art of coatings, including, for example, organic and inorganic colored pigments. Examples of suitable pigments and extenders include titanium dioxide such as anatase and rutile titanium dioxides; zinc oxide; antimony oxide; iron oxide; magnesium silicate; calcium carbonate; aluminosilicates; silica; various clays such as kaolin and delaminated clay; and lead oxide. It is also contemplated that the aqueous coating composition may also contain opaque polymer particles, such as, for example, ROPAQUE™ Opaque Polymers (available from The Dow Chemical Company). Also contemplated are encapsulated or partially encapsulated opacifying pigment particles; and polymers or polymer emulsions adsorbing or bonding to the surface of pigments such as titanium dioxide such as, for example, EVOQUE™ polymers (available from The Dow Chemical Company); and hollow pigments, including pigments having one or more voids.

Titanium dioxide is the main pigment used to achieve hiding in architectural paints. This pigment is expensive and in short supply. One way to achieve hiding while decreasing the amount of $TiO_2$ is to include multistage emulsion polymers, commonly known as "opaque polymers," that add opacity to the paint film. These polymers are water-filled emulsion polymer particles with a high $T_g$, such as particles polymerized using styrene as the predominant monomer. These particles fill with air during film formation and scatter light, thereby creating opacity.

The amounts of pigment and extender in the aqueous coating composition vary from a pigment volume concentration (PVC) of 0 to 85 and thereby encompass coatings otherwise described in the art, for example, as clear coatings, stains, flat coatings, satin coatings, semi-gloss coatings, gloss coatings, primers, textured coatings, and the like. The aqueous coating composition herein expressly includes architectural, maintenance, and industrial coatings, caulks, sealants, and adhesives. The pigment volume concentration is calculated by the following formula:

PVC (%)=(volume of pigment(s),+volume extender(s)×100)/(total dry volume of paint).

The solids content of the aqueous coating composition may be from 10% to 70% by volume. The viscosity of the aqueous coating composition may be from 50 centipoises to 50,000 centipoises, as measured using a Brookfield viscometer; viscosities appropriate for different application methods vary considerably, as is known to those skilled in the art.

In use, the aqueous coating composition is typically applied to a substrate such as, for example, wood, metal, plastic, marine and civil engineering substrates, previously painted or primed surfaces, weathered surfaces, and cementitious substrates such as, for example, concrete, stucco, and mortar. The aqueous coating composition may be applied to a substrate using conventional coating application methods such as, for example, brush, roller, caulking applicator, roll coating, gravure roll, curtain coater and spraying methods such as, for example, air-atomized spray, air-assisted spray, airless spray, high volume low pressure spray, and air-assisted airless spray.

Drying of the aqueous coating composition to provide a coating may be allowed to proceed under ambient conditions such as, for example, at 5° C. to 35° C. or the coating may be dried at elevated temperatures such as, for example, from greater than 35° C. to 50° C.

Some embodiments of the invention will now be described in detail in the following Examples.

EXAMPLES

The following examples are given to illustrate the invention and should not be construed as limiting its scope. All parts and percentages are by weight unless otherwise indicated.

Example 1

In this Example, the minimum film formation temperature of a composition comprising the compound of Formula 1, where n=4 to 8, and the compound of Formula 2 is evaluated.

Minimum film formation temperature (MFFT) is a screening test for coalescent efficiency and comparison using unpigmented resin and coalescent at given concentrations, and it defines the minimum coalescent concentration required for viable film formation at a given temperature (usually, 1-2° C.). The coalescent concentration (weight %) used in the formulation is based on the percentage of resin solids in latex emulsion. Samples for MFFT testing were formulated by mixing an aqueous polymeric dispersion (the latex emulsion RHOPLEX™ SG-LOAF from The Dow Chemical Company) with a polyethylene glycol phenyl ether (Formula 1, n=4-8) at various concentrations, and the glycol ether adipate of Formula 2 coalescing aid at 8 weight %. The formulations prepared for these experiments are shown in detail in Table 1:

TABLE 1

| | Aqueous Polymeric Dispersion (g) | Formula 1 (g) | Formula 1 (wt. %) | Formula 2 (g) | Water (g) | Total Sample (g) | % Solids |
|---|---|---|---|---|---|---|---|
| Compar. Comp. A | 17.04 | 0.00 | 0.00 | 0.70 | 7.29 | 25.03 | 34.99 |
| Inv. Comp. 1 | 17.03 | 0.18 | 2.04 | 0.70 | 7.11 | 25.02 | 34.99 |
| Inv. Comp. 2 | 17.05 | 0.35 | 4.03 | 0.70 | 6.95 | 25.05 | 34.98 |

Upon mixing, the samples are allowed to equilibrate at room temperature for four hours prior to MFFT testing. Subsequently, drawdowns for each sample are done for testing.

The MFFT plate is set to the appropriate temperature (the typical range being 0-12° C.) and allowed to stabilize. Once the temperature is stable, six 1-inch wide×24-inch long pieces of Scotch Magic Tape are placed on the MFFT plate. Care is taken to ensure that the plate is free of condensation and that the tape is securely in place. A circular 5 mil drawdown bar is centered over each piece of tape on the right hand side of the plate and sample is dispensed into the drawdown bar using a disposable pipette. Even pressure is used to drawdown the sample on the tape. A Plexiglas board with calibration lines corresponding to a specific heated position on the plate is set in place over the samples being tested and an air line is attached to the Plexiglas board. The air pressure is set at 20 psig and a timer set for 4 hours. Each sample is run in duplicate and the average value reported. The process is repeated for all independent samples.

The MFFT transition is indicated by the first sign of cracking observed on the tape. The spot is marked with a pen and the position compared to the calibration lines on the Plexiglas board. The dial on the temperature reading equipment is turned to the specific value indicated on the board and the corresponding temperature (in degrees F.) is read and recorded. The temperature is then converted into degrees C. and reported in Table 2:

TABLE 2

| | Formula 1 (wt. %) | MFFT (° C.) |
|---|---|---|
| Comparative Comp. A | 0.00 | 5 |
| Inventive Comp. 1 | 2.04 | 4 |
| Inventive Comp. 2 | 4.03 | 3 |

The MFTT of the aqueous polymeric dispersion is 16° C. Thus, the results of this Example show that the combination of Formula 1 and Formula 2 does not detract from the MFFT performance, and actually seems to improve performance.

Example 2

A batch of two gallons of a base paint formulation containing solids of 34 weight percent and a coalescent level of 8 weight percent, based on the polymer content of the aqueous polymeric dispersion, is prepared as described in Table 3:

TABLE 3

Base Paint Formulation for 2 Gallon Sample

| Material | Weight (grams) |
|---|---|
| Grind | |
| Ti-Pure R-746 (Chemours) | 3096.4 |
| Water | 342.1 |
| TAMOL ™ 165A (The Dow Chemical Company) | 78.9 |
| TRITON ™ GR-7M (The Dow Chemical Company) | 19.1 |
| Grind subtotal | 3536.6 |

TABLE 3-continued

Base Paint Formulation for 2 Gallon Sample

| Material | Weight (grams) |
|---|---|
| Let Down | |
| Drewplus L-475 (Ashland Inc.) | 18.2 |
| RHOPLEX ™ SG-10AF (The Dow Chemical Company) | 4488.8 |
| Water | 961.7 |
| ACRYSOL ™ RM-2020 NPR (The Dow Chemical Company) | 181.9 |
| ACRYSOL ™ RM-8W (The Dow Chemical Company) | 48.2 |
| Let Down subtotal | 5698.8 |
| TOTAL | 9235.4 |
| Actual Resin Solids | 2307.3 |

The functions of each additive are as follows: Ti-Pure R-746 (titanium dioxide slurry, used as pigment); TAMOL™ 165A (dispersant); TRITON™ GR-7M (surfactant, used as emulsifier and dispersant); Drewplus L-475 (foam control agent); RHOPLEX SG-10AF™ (aqueous polymeric dispersion); ACRYSOL RM-2020NPR and ACRYSOL RM-8W (rheology modifiers).

The components are added to a mix container in the order shown in Table 3 and as described below, and stirred by a variable speed mixer with an impeller attached. The grind portion of the formulation (order of addition: Ti-Pure R-746 slurry, water, TAMOL™ 165A, and TRITON™ GR-7M) is added to the container, and the mixture is allowed to stir for 5 minutes. Each of the components are first weighed into a separate container on a balance and then poured into the mix container. The Let Down portion is added to the container in the following order: Drewplus 475 followed by RHOPLEX™ SG10AF. The water, ACRYSOL™ RM-2020 NPR, and ACRYSOL™ RM-8W are added according to Table 3 because the viscosity (measured in Krebs Units or KU) is measured as the rheology modifiers are added to adjust the batch according to target viscosities of 100-105 KU.

Different examples are then prepared using this base paint formulation, a freeze-thaw additive, and a coalescent as shown in Table 4:

TABLE 4

| | Freeze-Thaw Additive (wt. %) | Wt. % of Freeze-Thaw Additive | Coalescent (wt. %) | Wt. % of Coalescent |
|---|---|---|---|---|
| Compar. Comp. B | Propylene Glycol | 8 | UCAR ™ Filmer IBT | 8 |
| Compar. Comp. C | Rhodoline FT 100 | 6 | Formula 2 | 8 |
| Compar. Ex. D | Rhodoline FT 100 | 8 | Formula 2 | 8 |
| Compar. Ex. E | Rhodoline FT 100 | 6 | UCAR ™ Filmer IBT | 8 |
| Compar. Ex. F | Rhodoline FT 100 | 8 | UCAR ™ Filmer IBT | 8 |
| Inv. Comp. 3 | Formula 1 | 6 | Formula 2 | 8 |
| Inv. Comp. 4 | Formula 1 | 8 | Formula 2 | 8 |
| Inv. Comp. 5 | Formula 1 | 6 | UCAR ™ Filmer IBT | 8 |
| Inv. Comp. 6 | Formula 1 | 8 | UCAR ™ Filmer IBT | 8 |
| Inv. Comp. 7 | Formula 1 | 6 | Optifilm 400 | 8 |
| Inv. Comp. 8 | Formula 1 | 8 | Optifilm 400 | 8 |

Rhodoline FT 100 is an existing freeze-thaw additive for waterborne paints, commercially available from Solvay. UCAR™ Filmer IBT is a 2,2,4-trimethyl-1,3-pentanediol monoisobutyrate coalescent commercially available from The Dow Chemical Company. Optifilm Enhancer 400 is a coalescent commercially available from Eastman Chemical Company.

The Examples shown in Table 4 are prepared by adding the specified freeze-thaw additive and coalescent to a 500 gram sample of the base paint formulation from Table 3. Table 5 shows the amounts that are post added to the base paint formulation for the Examples with 6% freeze-thaw additive and for the Examples with 8% freeze-thaw additive. Water is also added to complete the required amount for the formulation after addition of coalescent and freeze-thaw additive.

TABLE 5

| | 6 wt. % Freeze-Thaw Additive | 8 wt. % Freeze-Thaw Additive |
|---|---|---|
| Freeze-Thaw Additive (grams) | 7.5 | 10.0 |
| Coalescent (grams) | 10.0 | 10.0 |
| Water (grams) | 2.5 | |
| Total (incl. 500 grams of base paint formulation) | 520 | 520 |

The actual resin solids for the 500 gram sample of the base paint formulation is 124.9 grams. The amount of coalescent and freeze-thaw additive added to the base paint formulation is added to achieve the target weight percentages based on the solids in the base paint formulation.

The paint formulations containing the coalescent and freeze-thaw additive are subjected to 5 cycles of freezing and thawing. The samples are incubated at −23° C. overnight, and then allowed to thaw for approximately 8 hours. The samples are hand sheared with a tongue depressor for 100 stirs and the viscosity (KU) is measured. The results of this test are shown in Table 6.

TABLE 6

| | Freeze-Thaw Additive (wt. %) | Coalescent (wt. %) | Initial Visc. (KU) | Cycle 1 (KU) | Cycle 2 (KU) | Cycle 3 (KU) | Cycle 4 (KU) | Cycle 5 (KU) |
|---|---|---|---|---|---|---|---|---|
| Compar. Comp. B | Propylene Glycol (8%) | UCAR ™ Filmer IBT (8%) | 106.0 | >150 | >150 | >150 | >150 | >150 |
| Compar. Comp. C | Rhodoline FT 100 (6%) | Formula 2 (8%) | 75.4 | 111.7 | 90.6 | 89.9 | 90.8 | 93.0 |

TABLE 6-continued

| | Freeze-Thaw Additive (wt. %) | Coalescent (wt. %) | Initial Visc. (KU) | Cycle 1 (KU) | Cycle 2 (KU) | Cycle 3 (KU) | Cycle 4 (KU) | Cycle 5 (KU) |
|---|---|---|---|---|---|---|---|---|
| Compar. Ex. D | Rhodoline FT 100 (8%) | Formula 2 (8%) | 70.3 | 100.2 | 80.3 | 80.3 | 80.8 | 81.7 |
| Compar. Ex. E | Rhodoline FT 100 (6%) | UCAR™ Filmer IBT (8%) | 77.2 | 90.2 | 91.8 | 92.5 | 93.0 | 93.8 |
| Compar. Ex. F | Rhodoline FT 100 (8%) | UCAR™ Filmer IBT (8%) | 71.4 | 80.8 | 82.7 | 82.5 | 83.5 | 84.3 |
| Inv. Comp. 3 | Formula 1 (6%) | Formula 2 (8%) | 81.7 | 114.2 | 118.1 | 117.7 | 119.5 | 122.7 |
| Inv. Comp. 4 | Formula 1 (8%) | Formula 2 (8%) | 70.7 | 102.5 | 105.8 | 105.4 | 108.6 | 107.8 |
| Inv. Comp. 5 | Formula 1 (6%) | UCAR™ Filmer IBT (8%) | 79.7 | 115.4 | 120.3 | 119.5 | 118.2 | 119.9 |
| Inv. Comp. 6 | Formula 1 (8%) | UCAR™ Filmer IBT (8%) | 70.5 | 104.3 | 107.8 | 108.6 | 106.6 | 108.3 |
| Inv. Comp. 7 | Formula 1 (6%) | Optifilm 400 (8%) | 81.8 | 91.6 | 118.8 | 120.9 | 122.9 | 122.7 |
| Inv. Comp. 8 | Formula 1 (8%) | Optifilm 400 (8%) | 71.2 | 84.0 | 105.4 | 105.6 | 107.0 | 109.4 |

The data obtained for the Inventive Compositions (Inv. Comp. 3-8) are compared to comparative formulations (Compar. Comp. B-F) containing propylene glycol or alkoxylated tristyrylphenol (TSP) (Rhodoline FT-100) as freeze-thaw additives, and UCAR™ Filmer IBT and Optifilm Enhancer 400 as coalescents.

The paint formulation containing propylene glycol (Compar. Comp. B) failed the test after the first freezing and thawing cycle with a viscosity >150 KU that could not be measured. In contrast, the formulations prepared with the compound of Formula 1 passed the full 5 freeze-thaw cycles with only small increases in viscosity, and compared well with the formulations prepared with the TSP ethoxylate freeze-thaw additive (Compar. Comps. C-F). It should be noted that no effort was made to adjust the initial viscosity to a single value and instead just the net change on viscosity after freezing and thawing cycles is considered for comparison purposes.

Example 3

Gloss is a property of a paint used for characterizing appearance of a painted surface, and is a measurement of the degree at which the surface reflects light. A surface is said to have a high gloss if most of the light (>90%) is reflected off the surface. Gloss is measured using a gloss meter, by shining light on a surface at a particular angle (e.g., 20°, 60°, 85°) and measuring the reflectance into a receptor. The results are obtained in gloss units (GU), and the higher the number of units, the shinier the surface.

The gloss of the Comparative Compositions and Inventive Compositions from Example 2 are measured as follows. Each sample is drawn down on a labeled Leneta plain white Form WB chart. A 3 mil bird drawdown bar is used. The chart paper is attached to a glass drawdown plate. The sample is loaded next to the drawdown bar using a disposable pipet and a consistent pressure and motion are used to perform the drawdown. The labeled chart is placed on a tray in a rack located in a constant temperature room. The next day, gloss is measured using a Micro Tri-Gloss)(20°/60°/85° Instrument. For each reading, the instrument is moved to a different position on the substrate. The instrument is calibrated before use and an average of three readings for each sample at each angle is reported in Table 7.

TABLE 7

| | Freeze-Thaw Additive (wt. %) | Coalescent (wt. %) | Gloss @20° | Gloss @60° | Gloss @85° |
|---|---|---|---|---|---|
| Compar. Comp. B | Propylene Glycol (8%) | UCAR™ Filmer IBT (8%) | 28.6 | 69.0 | 94.2 |
| Compar. Comp. C | Rhodoline FT 100 (6%) | Formula 2 (8%) | 22.4 | 57.4 | 91.6 |
| Compar. Ex. D | Rhodoline FT 100 (8%) | Formula 2 (8%) | 23.2 | 62.5 | 91.7 |
| Compar. Ex. E | Rhodoline FT 100 (6%) | UCAR™ Filmer IBT (8%) | 16.1 | 57.4 | 92.2 |
| Compar. Ex. F | Rhodoline FT 100 (8%) | UCAR™ Filmer IBT (8%) | 16.0 | 55.3 | 92.4 |
| Inv. Comp. 3 | Formula 1 (6%) | Formula 2 (8%) | 30.0 | 68.6 | 94.0 |
| Inv. Comp. 4 | Formula 1 (8%) | Formula 2 (8%) | 26.2 | 65.1 | 93.1 |
| Inv. Comp. 5 | Formula 1 (6%) | UCAR™ Filmer IBT (8%) | 22.2 | 63.7 | 93.5 |
| Inv. Comp. 6 | Formula 1 (8%) | UCAR™ Filmer IBT (8%) | 17.0 | 57.9 | 93.1 |
| Inv. Comp. 7 | Formula 1 (6%) | Optifilm 400 (8%) | 29.9 | 68.3 | 93.6 |
| Inv. Comp. 8 | Formula 1 (8%) | Optifilm 400 (8%) | 26.3 | 65.0 | 92.1 |

The addition of the compound of Formula 1 resulted in formulations that showed higher gloss than those prepared with the commercial TSP ethoxylate product (Rhodoline FT-100). Thus, the combination of the compound of Formula 1 with the different coalescents results in improvement in MFFT, freeze-thaw stability, and gloss.

Example 4

500 grams of an aqueous coating composition according to one embodiment of the present invention (Inventive Composition 9) containing 5 weight percent of a freeze-thaw additive and a coalescent level of 8 weight percent, based on the polymer content of the aqueous polymeric dispersion, is prepared as described in Table 8:

TABLE 8

500 Gram Sample of Inventive Composition 9

| Material | Weight (grams) |
| --- | --- |
| Grind | |
| Ti-Pure R-746 (Chemours) | 161.3 |
| Water | 21.4 |
| TAMOL ™ 165A (The Dow Chemical Company) | 4.1 |
| TRITON ™ GR-7M (The Dow Chemical Company) | 1.0 |
| Grind subtotal | 187.8 |
| Let Down | |
| Drewplus L-475 (Ashland Inc.) | 0.95 |
| RHOPLEX ™ SG-10AF (The Dow Chemical Company) | 233.8 |
| Formula 2 Coalescent | 9.6 |
| Formula 1 Freeze-Thaw Additive | 6.0 |
| Water | 49.8 |
| ACRYSOL ™ RM-2020 NPR (The Dow Chemical Company) | 9.5 |
| ACRYSOL ™ RM-8W (The Dow Chemical Company) | 2.5 |
| Let Down subtotal | 312.2 |
| TOTAL | 500 |
| Actual Resin Solids | 120.2 |

The functions of each additive are as described above in connection with Example 2.

The components are added to a mix container in the order shown in Table 8 and as described below, and stirred by a variable speed mixer with an impeller attached. The grind portion of the formulation (order of addition: Ti-Pure R-746 slurry, water, TAMOL™ 165A, and TRITON™ GR-7M) is added to the container, and the mixture is allowed to stir for 5 minutes. Each of the components are first weighed into a separate container on a balance and then poured into the mix container. The Let Down portion is added to the container in the following order: Drewplus 475 followed by RHOPLEX™ SG10AF, followed by the Formula 2 Coalescent and the Formula 1 Freeze-Thaw Additive. The water, ACRYSOL™ RM-2020 NPR, and ACRYSOL™ RM-8W are added according to Table 8 because the viscosity (measured in Krebs Units or KU) is measured as the rheology modifiers are added to adjust the batch according to target viscosities of 100-105 KU.

Inventive Composition 9 is subjected to 5 cycles of freezing and thawing. The samples are incubated at −23° C. overnight, and then allowed to thaw for approximately 8 hours. The samples are hand sheared with a tongue depressor for 100 stirs and the viscosity (KU) is measured. The results of this test are shown in Table 9.

TABLE 9

| | Freeze-Thaw Additive (wt. %) | Coalescent (wt. %) | Initial Visc. (KU) | Cycle 1 (KU) | Cycle 2 (KU) | Cycle 3 (KU) | Cycle 4 (KU) | Cycle 5 (KU) |
| --- | --- | --- | --- | --- | --- | --- | --- | --- |
| Inv. Comp. 9 | Formula 1 (5%) | Formula 2 (8%) | 92.0 | 120.0 | 120.6 | 122.9 | 126.1 | 130.0 |

As with the other Inventive Compositions, Inventive Composition 9 prepared with the compound of Formula 1 passed the full 5 freeze-thaw cycles with only small increases in viscosity, and compared well with the formulations prepared with the TSP ethoxylate freeze-thaw additive (Compar. Comps. C—F from Example 2). It should be noted that no effort was made to adjust the initial viscosity to a single value and instead just the net change on viscosity after freezing and thawing cycles is considered for comparison purposes.

We claim:

1. A method for improving the freeze/thaw stability of an aqueous coating composition comprising an aqueous polymeric dispersion, the method comprising adding the compound of Formula 1 to the aqueous coating composition:

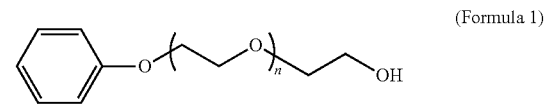

(Formula 1)

wherein n=4 to 8 and wherein 5 to 10 percent by weight of the compound of Formula 1 is added, based on the weight of the polymeric dispersion solids.

2. The method of claim 1, wherein n=5 to 7.

3. The method of claim 1, wherein n=5 to 6.

4. The method of claim 1, further comprising adding at least one coalescent to the aqueous coating composition.

5. The method of claim 4, wherein the coalescent comprises the compound of Formula 2:

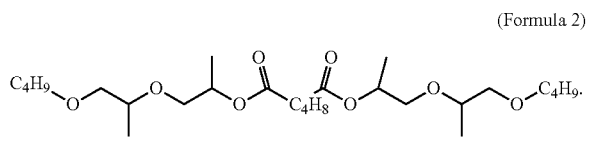

(Formula 2)

6. The method of claim 4, wherein the coalescent comprises at least one of propylene glycol phenyl ether, ethylene glycol phenyl ether, dipropylene glycol n-butyl ether, ethylene glycol n-butyl ether benzoate, tripropylene glycol n-butyl ether, 2,2,4-trimethyl-1,3-pentanediol monoisobutyrate, triethylene glycol bis-2-ethylhexanoate, and tributyl citrate.

7. The method of claim 5, wherein 2 to 12 percent by weight of the compound of Formula 2 is added, based on the weight of the polymeric dispersion solids.

8. The method of claim 1, wherein the aqueous polymeric dispersion comprises an acrylic polymer.

9. An aqueous coating composition comprising an aqueous polymeric dispersion and the compound of Formula 1:

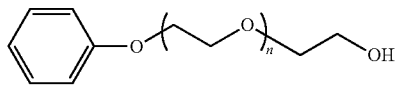
(Formula 1)

wherein n=5 to 7 and wherein the coating composition comprises 5 to 10 percent by weight of the compound of Formula 1 based on the weight of the polymeric dispersion solids.

10. The coating composition of claim 9, wherein n=5 to 6.

11. The coating composition of claim 9, wherein the coating composition comprises 5 to 8 percent by weight of the compound of Formula 1 based on the weight of the polymeric dispersion solids.

12. The coating composition of claim 9, further comprising at least one coalescent.

13. The coating composition of claim 12, wherein the coalescent comprises the compound of Formula 2:

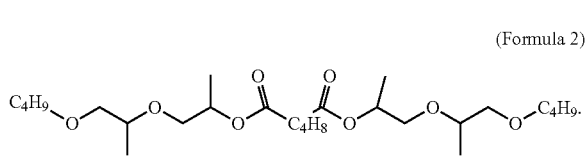
(Formula 2)

14. The coating composition of claim 12, wherein the coalescent comprises at least one of propylene glycol phenyl ether, ethylene glycol phenyl ether, dipropylene glycol n-butyl ether, ethylene glycol n-butyl ether benzoate, tripropylene glycol n-butyl ether, 2,2,4-trimethyl-1,3-pentanediol monoisobutyrate, triethylene glycol bis-2-ethylhexanoate, and tributyl citrate.

15. The coating composition of claim 13, wherein the coating composition comprises 2 to 12 percent by weight of the compound of Formula 2 based on the weight of the polymeric dispersion solids.

16. The coating composition of claim 9, wherein the aqueous polymeric dispersion comprises an acrylic polymer.

17. A composition comprising the compound of Formula 1:

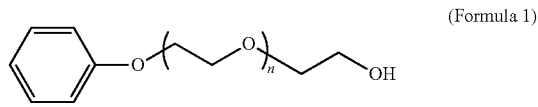
(Formula 1)

wherein n=4 to 8; and
the compound of Formula 2:

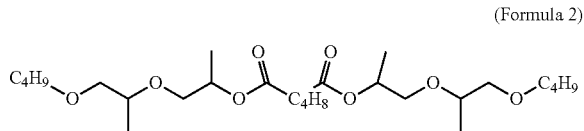
(Formula 2)

wherein the composition comprises 30 to 70 percent by weight of Formula 1 and 30 to 70 percent by weight of the compound of Formula 2.

18. The composition of claim 17, wherein n=5 to 7.

* * * * *